Nov. 8, 1949     H. F. GORE     2,487,234
TEMPLET COVER OR PIE AND CAKE CUTTING GUIDE AND COVER
Filed May 22, 1948
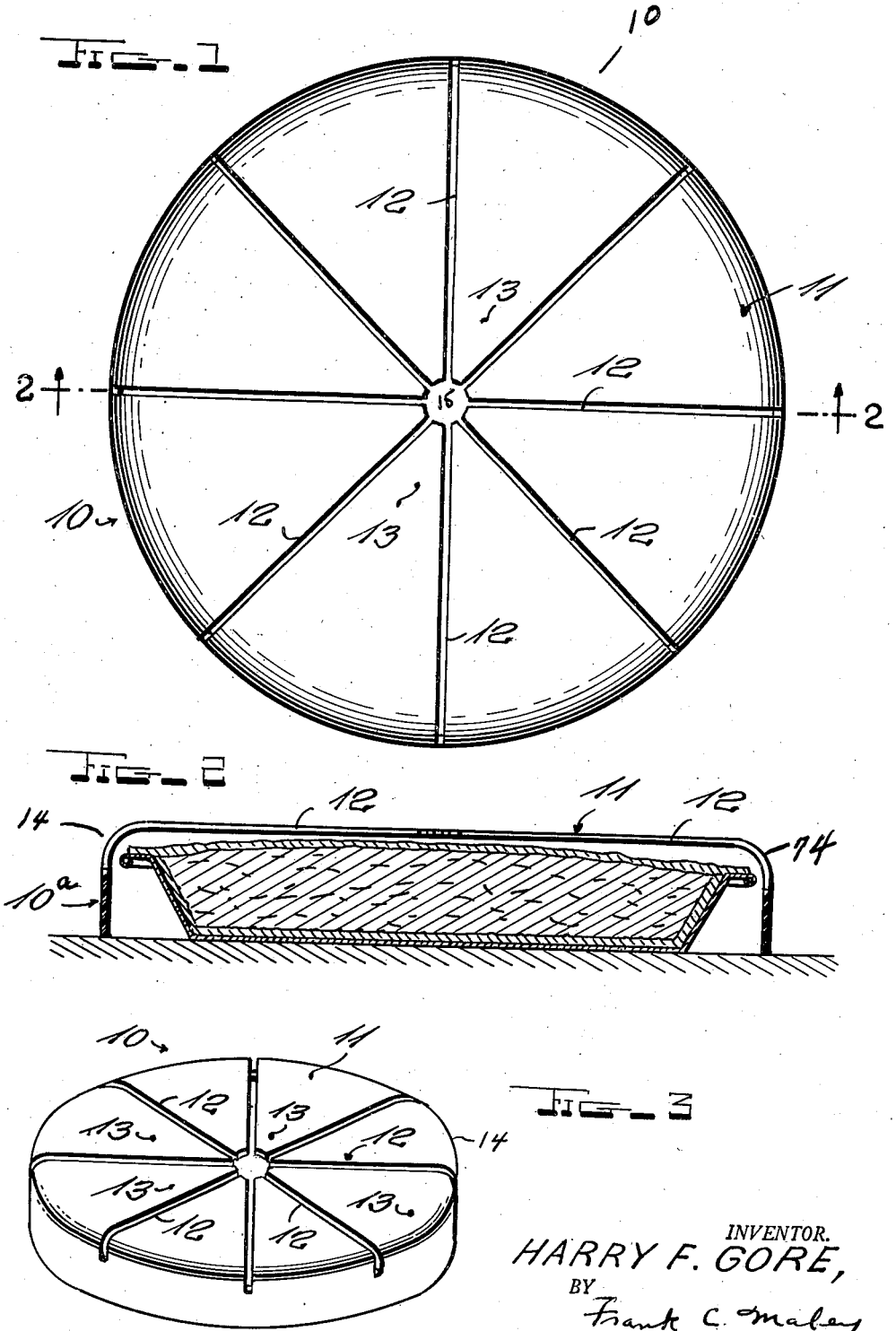
INVENTOR.
HARRY F. GORE,
BY Frank C. Maley
AGENT Patented Nov. 8, 1949

2,487,234

UNITED STATES PATENT OFFICE 2,487,234

TEMPLET COVER OR PIE AND CAKE CUTTING GUIDE AND COVER

Harry F. Gore, Bound Brook, N. J.

Application May 22, 1948, Serial No. 28,663

6 Claims. (Cl. 146—150)

This invention relates to improvements in templet covers for pies and the like or combined pie and cake cutting guide and cover.

Pies or cakes, for dispensing purposes in restaurants, etc., are generally served in sections or "cuts," the pie being divided into conical sections when the initial section is to be cut, since the cutting of the pie or cake can then be by diagonal cuts. Unless some form of templet or guide is used, the dimensions of the sections may vary materially. Also the cut pie or cake mounted on its plate, exposes the content and may tend to permit drying out action if completely exposed to air. Because of the possibility of contamination, there is frequently a legal requirement that pies be covered or otherwise protected when being displayed.

The present invention is designed to meet both of these conditions by the provision of an integral structure which can be readily positioned in covering position relative to the pie and its plate, and which is so formed as to serve as a templet by means of which the pie can be accurately cut to provide the section characteristic without disturbing the covered condition. The cover, if formed of transparent material, will additionally permit the customer and the clerk to inspect the pie without raising the cover, an advantage where trade is brisk and different types of pies are being dispensed.

The structure itself is an integral structure of inverted-U form, with the top substantially planar, being dimensioned to freely receive the pie and its plate with the planar top overlying the top of the pie in spaced relation to the top but sufficiently near as to permit a knife blade, passed through the planar top, to cut the pie radially into its sections. To permit the latter, the top is formed with radial slots which permit the passage of the knife blade. The meeting zone of the top wall and the annular side wall being curved and blending into these walls with the slots extending through the curved zone but ending a material distance above the bottom plane of the annular wall, permits manipulation of the knife blade to assure complete severance of adjacent pie sections. If the number of sections is equal, opposing radial slots form a diameter of the structure, permitting the cutting to be from edge to edge of the pie.

The structure is preferably of transparent plastic, but of course it may be opaque and formed of plastic, wood, metal or any desired combination of materials. However, it is preferred that the walls be of substantially uniform thickness, thus giving the appearance of a sheet construction, ensuring light weight. And since it is integral, it is capable of rough handling without danger of breakage, and is, of course, readily cleansed by washing. It is of comparatively low cost of manufacture, and capable of long-life service.

To these and other ends, therefore, the nature of which will be more clearly understood as the invention is hereinafter disclosed, said invention consists in the improved construction and combinations hereinafter more particularly described, illustrated in the accompanying drawings, and more particularly pointed out in the appended claims.

In the accompanying drawings in which similar reference characters indicate similar parts in each of the views, Figure 1 is a plan view of the device;

Figure 2 is a sectional view taken on the line 2—2 of Figure 1; and

Figure 3 is a perspective view.

In the drawings, the cover indicated at 10, is of inverted-U shape, having a top 11, preferably planar in type, and an annular side wall 10a, the top and side wall being connected by a curved zone 14 which blends into the top and side walls. The wall 10a is of sufficient depth to assure that the pie and its plate can be readily positioned beneath the top without the top 11 actually contacting the top of the pie, since the latter may be of the soft top type.

To permit cutting of the pie into the desired sections, the top 11 is provided with a plurality of properly located radial slots 12, each of these extending from an opening 15 at the axis of the top to and through the curved zone 14. This causes the material between the slots to form sectors 13 having conical form which is slightly truncated at its inner end, due to opening 15, the dimensions of the latter being such as to set up the truncated condition. The advantage of this lies in the fact that the inner angular end of the cone-shaped sector is not sharply pointed, but is actually blunt, thus preventing possibility of damage to the user or to the pie.

The width of the slots 12 is such that a knife blade can be readily passed therethrough and into and through the pie, and then be drawn through the length of the slot. Since the latter also extends through the curved zone, the knife blade can be readily moved to cut the pie completely to its outer edge regardless of the form of the plate in which it had been baked. In the drawings, the number of slots is indicated as eight, thus permitting the pie to be cut diametrically, but obviously the number of slots will depend upon the desire of the user, the number showing being illustrative only.

The dimensions shown are not arbitrary, it being obvious that the structure can be produced to meet any of the standard dimensions of commercial pie plates, etc.; hence, any desired size, material, or color, may be employed.

I claim:

1. A template for cutting pies and the like while mounted on its plate, said template being of inverted cup-shape with its top wall substantially parallel with the plate bottom and the side wall substantially normal thereto, said template being dimensioned internally to freely contain the pie and its plate when the plate and template are mounted on a common supporting surface, said template having its top wall formed with a central opening of definite dimensions and of less diameter than the width of the knife blade used in cutting the pie, said wall additionally having spaced slots radiating from said opening with each slot extending into the upper zone of the side wall to thereby permit the knife blade to traverse predetermined slots and maintain knife contact with the upper face and peripheral edge zone of the pie plate during the pie-cutting operations, the side wall zones of the slots extending below the plane of the peripheral edge of the pie plate to thereby assure the clean severance of the boundary crust of the pie in providing the cut.

2. A template as in claim 1 characterized in that the slots are equally spaced.

3. A template as in claim 2 characterized in that the number of slots is even to thereby provide a slot as alined with one other slot with both slots extending on a diameter of the template, whereby the pie may be cut by radial or diametrical strokes of the knife blade.

4. A template as in claim 1 characterized in that the spacing of the slots and the dimensions of the opening are such as to present the opening wall of each sector as of a width to form a blunt inner end to the sector formed between adjacent slots.

5. A template as in claim 1 characterized in that the width of each slot is slightly greater than the thickness of the knife blade to thereby render both side faces of the slot potentially active during a cutting operation based on the slot.

6. A template as in claim 1 characterized in that the annular zone connecting the planar top wall and the annular side wall is of arcuately-curved contour blending into both walls with the slots extending through the zone to thereby assure accurate cutting of the peripheral crust zone of the pie.

HARRY F. GORE.

REFERENCES CITED

The following references are of record in the file of this patent:

UNITED STATES PATENTS

| Number | Name | Date |
| --- | --- | --- |
| 183,283 | Cate | Oct. 17, 1876 |
| 1,140,153 | Hank | May 18, 1915 |
| 2,027,198 | Rappold | Jan. 7, 1936 |
| 2,189,955 | Hokerk | Feb. 13, 1940 |
| 2,236,636 | McGill | Apr. 1, 1941 |

FOREIGN PATENTS

| Number | Country | Date |
| --- | --- | --- |
| 389,120 | France | Mar. 15, 1909 |